United States Patent Office 3,357,100
Patented Dec. 12, 1967

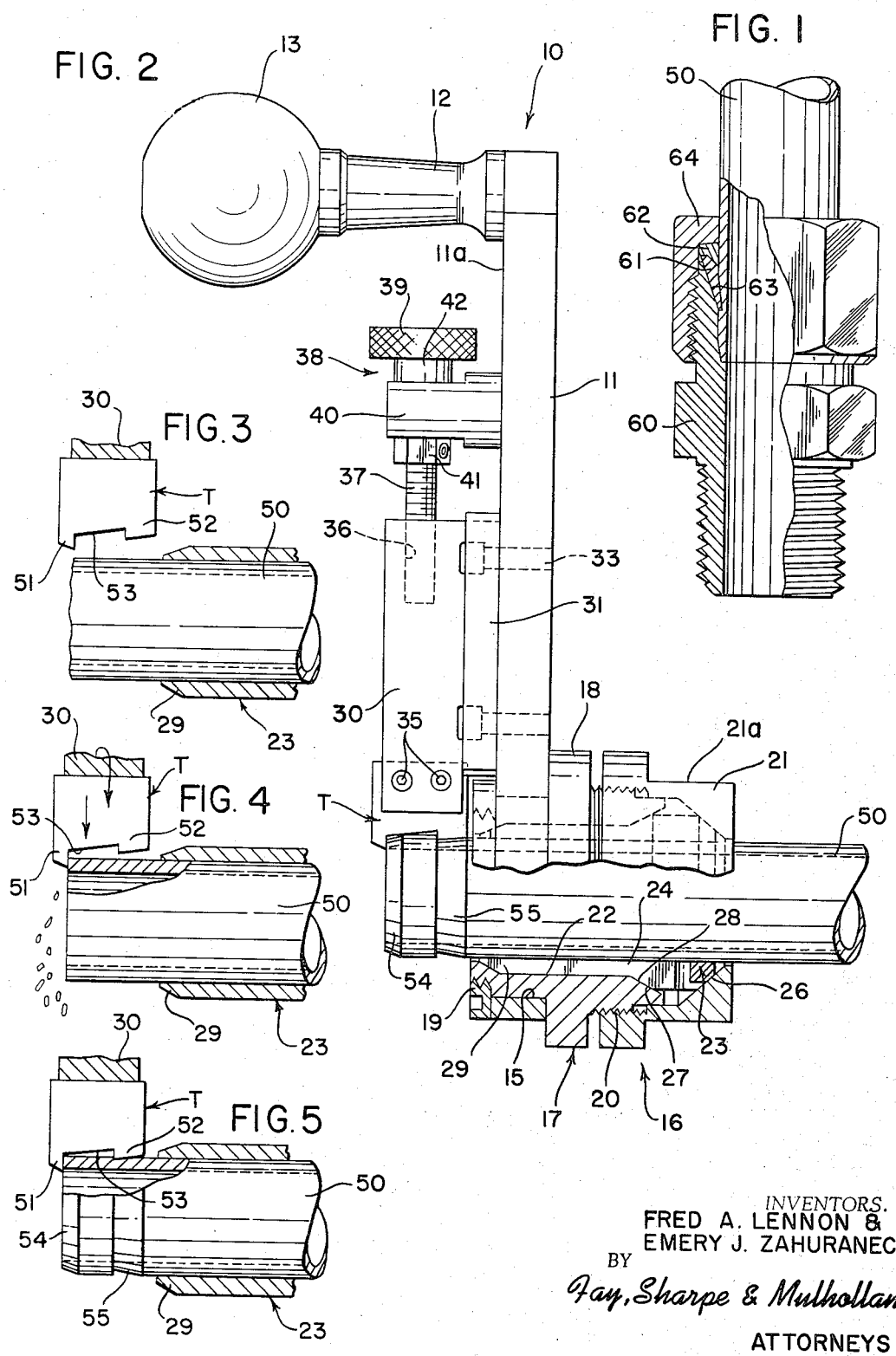

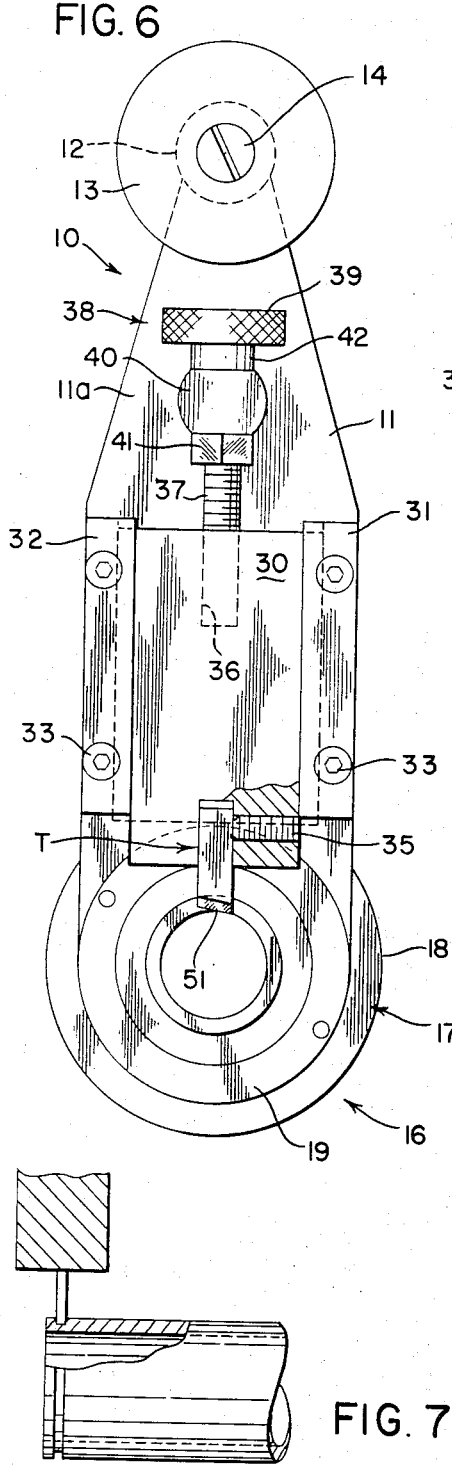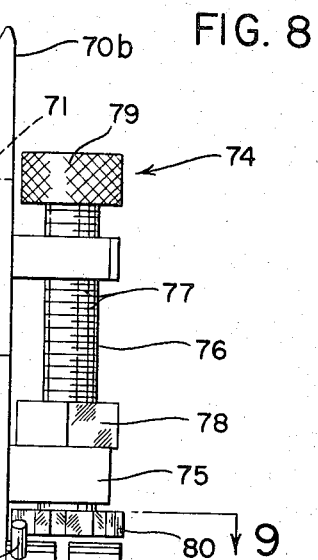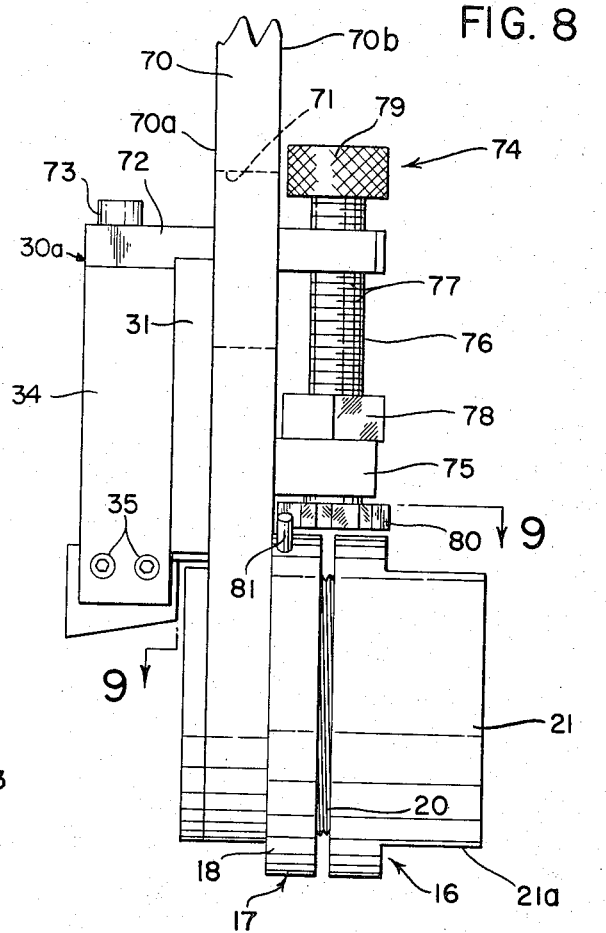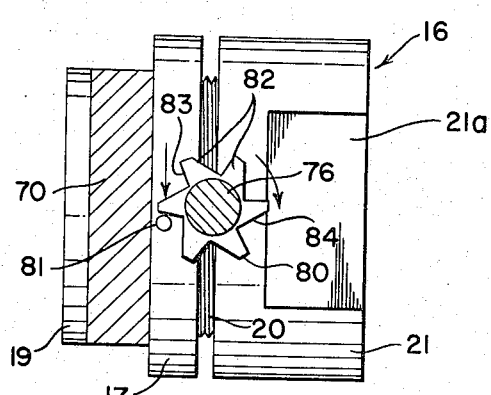

3,357,100
TUBE CUTTING TOOL
Fred A. Lennon, Chagrin Falls, and Emery J. Zahuranec, Solon, Ohio, assignors to Crawford Fitting Company, Solon, Ohio, a corporation of Ohio
Filed Mar. 4, 1966, Ser. No. 531,887
6 Claims. (Cl. 30—98)

ABSTRACT OF THE DISCLOSURE

A tube cutting tool having a platform with an aperture therein and clamping means for the tube rotatably secured in the aperture. A cutting tool holder is slidably supported on the platform by longitudinal guides on either side and holds a cutting means. A threaded shaft which is operatively connected to the tool holder is also supported on the platform and governs the position of the tool.

---

This invention relates to a cutting tool for tubes and more particularly to a tool designed to form grooves in thick walled tubing.

Tube fittings of a conventional design ordinarily have been employed with tubing formed from a deformable material so that the tubing may be connected to the fitting. Exemplary of this type of fitting are swage type fittings in which swaging of the tubing material occurs so that the tubing is firmly gripped by the fitting. With the advent of high pressure applications, however, it has become necessary to employ thick walled tubing formed from material such as stainless steel. It is readily apparent that material such as this is more difficult to deform with the result that conventional types of fittings have been difficult to adapt to these latter types of tubing.

It is an object of this invention to provide a tool which will adapt a tube for use with a tube fitting.

More particularly, it is an object of this invention to provide a tube grooving tool in which a groove is formed in the end of a length of tubing to receive the ferrules of a ferrule type fitting.

Specifically, this invention contemplates a tube grooving tool which comprises a support member having an aperture in one end and a handle at the opposite end. A tool holder is movably carried on said support for movement toward and away from the aperture. A collet chuck is rotatably secured to the support in coaxial alignment with the aperture and is designed to support a length of tube nonrotatably in the aperture. Tool means are supported on the tool holder and feed means on the support is operable to move the tool holder and tool means toward and away from the tube in the aperture.

Other features and objects will become more apparent upon a complete reading of the following description and perusal of the accompanying drawings.

In the drawings:

FIG. 1 is an elevation view partly in section of a tube fitting assembled on the end of the tube after using the tube grooving tool comprising the instant invention;

FIG. 2 is a side elevation view showing the tool in operation on the end of a length of tubing;

FIGS. 3, 4 and 5 illustrate schematically the sequential steps of the tool in performing the operations on the end of a length of tubing;

FIG. 6 is a plan view of the tool of FIG. 2;

FIG. 7 is a view similar to FIG. 5 showing the use of an alternative shape of cutting tool;

FIG. 8 is a partial side elevation view similar to FIG. 2 illustrating an alternative embodiment of the invention;

FIG. 9 is a view taken along line 9—9 of FIG. 8.

Referring now to FIG. 2, there is illustrated a hand tool indicated generally by the reference numeral 10 which incorporates the principles of the instant invention. This tool includes a platform support member 11 at one end of which there is secured a pedestal 12 and a handle 13. It is contemplated that the handle 13 will be rotatably supported on the pedestal 12 in a known manner such as by a screw fastener 14.

At the other end of the support platform 11 is an aperture 15 in which there is received a collet chuck assembly indicated generally by the reference numeral 16. This collet chuck assembly may be of any design which is adequate to support the end of a tube nonrotatably therein. The design illustrated in FIG. 2 comprises a body 17 which is rotatably received in the aperture 15. The body 17 is retained in the aperture by a radially extending flange 18 which engages the lower surface of the platform support 11 and a threaded ring 19 which is threadedly received over the end of the body 17 which projects through the aperture 15. It is readily apparent that with this construction, the support platform 11 may be rotated circumferentially of the body 17.

The chuck body 17 includes a threaded extension 20 over which a threaded nut 21 is received. In the central passage 22 in the body 17 there is received a collet member 23 which is adapted to be contracted around the end of a length of tube. The collet may be of a construction such as that shown in U.S. Patent No. 2,228,685. As shown in that patent, the collet includes a plurality of longitudinal slots 24 which permit the collet to be compressed and contracted upon the exterior surface of a length of tubing. The contraction of the collet upon the end of the tubing is accomplished by the coupling nut 21 which coacts with a frusto-conical surface 26 on the end of the collet. As the coupling nut is threaded on the body 17, the collet is moved axially into a position of engagement between the forwardly facing frusto-conical surface 27 on the collet and the camming mouth 28 on the extension 20. The nose of the collet 29 also engages a camming surface on the adjacent portion of the chuck body so that the segmental collet is contracted about the tubing to firmly grip and restrain the tubing from movement from the chuck.

The tool further includes a tool holder 30 slidably mounted on the upper surface 11a of the platform support 11. Slide guides 31, 32 are disposed on opposite sides of the tool holder 30 and secured by screw fasteners 33 to the surface of the platform support. The slide guides include bevelled surfaces which cooperate with correspondingly bevelled surfaces on the tool holder to provide a tongue and groove slide for the holder 30.

The end of the holder adjacent the aperture 15 includes provision for mounting a metal-working tool T. The tool is removably attached to the holder by any appropriate means such as screw fasteners 35.

The other end of the tool holder 30 includes a threaded bore 36 in which there is received the threaded end of a shaft 37 comprising a part of a feed mechanism 38. The shaft 37 is rotatably supported in a base 40 with a knob 39 on the end of the shaft projecting through the base. The shaft 37 is fixed longitudinally in the base 40 by a lock nut 41 on one side of the base and boss 42 on the opposite side of the base. It is believed apparent that rotation of the knob 39 will cause the threaded shaft 37 to cooperate with the threaded walls of the bore 36 to displace the tool holder 30 in a direction toward or away from the aperture 15.

The above described device is employed in the following manner: As illustrated in FIG. 2, the tool T comprises a cut-off and grooving tool T. To perform these operations, the nut 21 is rotated so that the collet 23 is in an expanded condition. A length of tubing 50 is inserted in the chuck to a position where the end is approximately coinciding with the tool T. The nut 21 is then threaded on the body 17 to contract the collet about the surface of the tube and secure the tube in the chuck 16. The nut 21 ordinarily will have formed thereon a pair of flats 21a which will permit the nut to be secured in a vise or similar work-holding mechanism. The knob 39 is then rotated to move the tool support 30 to a position wherein the tool T engages the surface of the tube 50. Grasping the handle 13, the operator will then rotate the platform 11 relative to the chuck 16. As the platform rotates, the tool T will traverse circumferentially the tube 50 and, in accordance with the configuration of the tool T, remove metal from the tube.

As shown in FIGS. 3-5, the tool T includes a cut-off portion 51 and a grooving portion 52 with an intermediate cutting surface 53 which performs a bevelling operation. The cut-off edge 51 of the tool T is disposed axially forward and radially inward of the grooving edge 52 so that the end of the tube is cut off and faced prior to the engagement of the grooving edge 52. This is particularly important where a ferrule-type fitting is to be employed since it is necessary to locate the groove accurately relative to the end of the tube. As the machining operation continues, the knob 39 is periodically rotated to advance the tool holder so that the bevelling edge 53 and the groove cutting edge 52 engage the tube and form corresponding bevelled surface 54 and groove 55. When it has been determined that a satisfactory groove has been formed in the tube 50, the knob 39 is rotated in the opposite direction to retract the tool T from engagement with the tube and the tube is removed from the chuck 16.

The bevelled and grooved end of the tube may then be inserted in a tube fitting such as that illustrated in FIG. 1. The fitting in FIG. 1 is of the type shown in U.S. Patent No. 3,103,373. As described in that patent, the fitting comprises a body 60 in which the tube end is received. A pair of ferrules 61, 62 are designed to cooperate with a camming mouth 63 and a coupling nut 64 to secure the tube in the fitting body. To effect the proper grip of the ferrules against the surface of the tube 50, it is contemplated that a swaging action normally will occur. However, in the thick wall tubing of material such as stainless steel, it is extremely difficult to obtain the proper swaging action. Accordingly, the groove 55 is accurately located relative to the end of the tube so that during the coupling operation, the front ferrule 61 will be advanced and contracted radially inward to a position in which it is disposed in the groove 55. The coaction of the ferrule and the groove serve to retain and seal the tube in the fitting body 60.

Turning to the alternative embodiment of FIG. 8, there is illustrated a tool substantially similar in construction to the above-described tool with the addition of an automatic feed means for advancing the tool holder toward the tube. Thus, the tool of FIG. 8 includes a support platform 70 and a collet chuck mechanism 16 which is the same as the collet chuck in the embodiment of FIG. 2. A tool holder 30a is slidably supported on the upper surface 70a of the platform by slide guides 31, 32. The platform 70 includes an aperture 71 which is elongated in form and has its longitudinal axis intermediate the slide guides 31, 32. The tool holder 30a includes a depending leg member 72 which extends through the aperture 71 and which is secured through threaded screw fastener 73 to the tool support block 34. A screw feed mechanism 74 is supported on the lower surface 70b of the platform 70 by a base pedestal 75 in which is rotatably received a shaft 76. The shaft 76 includes screw threads 77 over a portion of its length with the screw threaded portion of the shaft 76 being threadedly received in a bore in the member 72 which projects below the platform 70. A lock nut 78 restrains the shaft 76 from longitudinal movement. A knob 79 is secured on one end of the shaft 76 and a ratchet wheel 80 is secured on the other end of the shaft.

As is apparent from FIG. 8, the ratchet wheel 80 is disposed immediately adjacent the chuck 16. A projecting pin 81 is carried by the flange 18 on the body 17 of the chuck. The ratchet member includes a plurality of teeth 82 each of which is provided with a flat face 83 on one side and a rearwardly tapering face 84 on the opposite side.

The operation of the embodiment of FIG. 8 is similar to that described in connection with the embodiment of FIG. 2. Thus, by inserting the chuck in a vise, the chuck is held stationary and the platform 70 may be rotated about the chuck and the tube secured therein. As the platform is rotated, the ratchet wheel 80 will engage the pin 81 in the manner illustrated in FIG. 9. Engagement of the ratchet wheel with the pin will cause the ratchet wheel to be rotated one tooth for each rotation of the platform about the chuck. As the ratchet wheel is rotated, a corresponding rotation is imparted to the shaft 76 and, due to the threaded connection between the shaft and the member 72, the tool holder 30a will be advanced or retracted depending upon the direction of rotation.

Referring to FIG. 7, there is an illustration of an alternative use to which the tools of FIG. 2 and FIG. 8 may be put. As shown in FIG. 8, the tool is used to form a bevel on the forward end of a tube. The bevel may be designed to cooperate with a similarly configured surface in the interior of a tube fitting body. It will also be appreciated that other types of cutting tools may be employed as, for example, a tube cut-off tool might be used to sever the tube into desired lengths. Whether bevelling, cutting or performing the combination of operations illustrated in FIGS. 3-5, the essential principles of the tool remain the same.

We claim:
1. A tube cutting tool comprising:
    a platform;
    an aperture formed in said platform;
    clamping means for holding a tube, said clamping means being received in the aperture in said platform and comprising a body member having a passage therethrough,
    said body member having one end thereof projecting through the aperture in said platform,
    retaining means secured to said one end of said body member,
    collet means in the passage in said body member adapted to be contracted about a tube, and
    nut means adjustably carried on said body member in operative engagement with said collet means whereby said collet means may be contracted to secure a tube in said body member,
    means for securing said platform to said clamping means for rotation thereabout,
    cutting tool means,
    means supporting said cutting tool means on said platform for movement relative to said platform, said supporting means including a shaft rotatably supported on said platform,
    said shaft having threads over at least a portion of its length to impart longitudinal movement to said tool means,
    a tool holder operatively connected to said shaft and supporting a tool, and
    longitudinal guide means on said platform supporting said tool holder on either side along its length for movement relative to said platform.

2. The combination of claim 1 wherein said supporting means includes manually operated feed means, said means including a base member secured to said platform, and a threaded shaft member extending through said base member for moving said cutting tool means.

3. The combination of claim 1 wherein said supporting means includes means for automatically moving said cutting tool means relative to said platform as said platform is rotated about said clamping means.

4. The combination of claim 3 wherein said automatic means comprises:
projecting pin means on said clamping means;
shaft means in engagement with said cutting tool means;
said shaft means having a threaded portion cooperating with a threaded portion on said tool means;
a ratchet wheel having a plurality of teeth secured to said shaft;
said shaft means being rotatably supported on said platform with said ratchet wheel adjacent said projecting pin means whereby rotation of said platform about said clamping means causes periodic engagement of said projecting pin means with a tooth on said ratchet wheel thereby to impart rotation to said shaft.

5. The combination of claim 1 wherein said cutting tool means includes:
a cutting tool having a first cutting edge at one side thereof;
a second edge on said tool spaced laterally of said first edge;
said first cutting edge extending longitudinally of said tool forwardly of said second edge; and
a third edge on said tool intermediate said first and second edges, said second and third edges substantially transverse to the first edge.

6. The combination of claim 1 wherein said cutting tool means includes:
a second aperture in said platform spaced from said first aperture;
a depending leg having one end attached to said tool holder extending through said second aperture;
said shaft being in threaded engagement with one end of said leg.

References Cited

UNITED STATES PATENTS

| | | | |
|---|---|---|---|
| 253,788 | 2/1882 | Thomas | 30—93 |
| 519,183 | 5/1894 | Gourd | 30—98 |
| 553,802 | 1/1896 | Bordens et al. | 82—13 |
| 587,093 | 7/1897 | French | 30—97 |
| 669,866 | 3/1901 | Thomas | 30—94 |
| 1,018,695 | 2/1912 | Charpier et al. | 30—98 |
| 2,228,685 | 1/1941 | Benjamin | 279—49 |
| 2,373,155 | 4/1945 | White | 82—13 |
| 2,672,682 | 3/1954 | Studebaker et al. | 30—97 |
| 3,279,059 | 10/1966 | Keiter | 30—96 |

MYRON C. KRUSE, *Primary Examiner.*